J. G. Hunt,
Portable Fence,
No. 474. Reissued June 30, 1857.
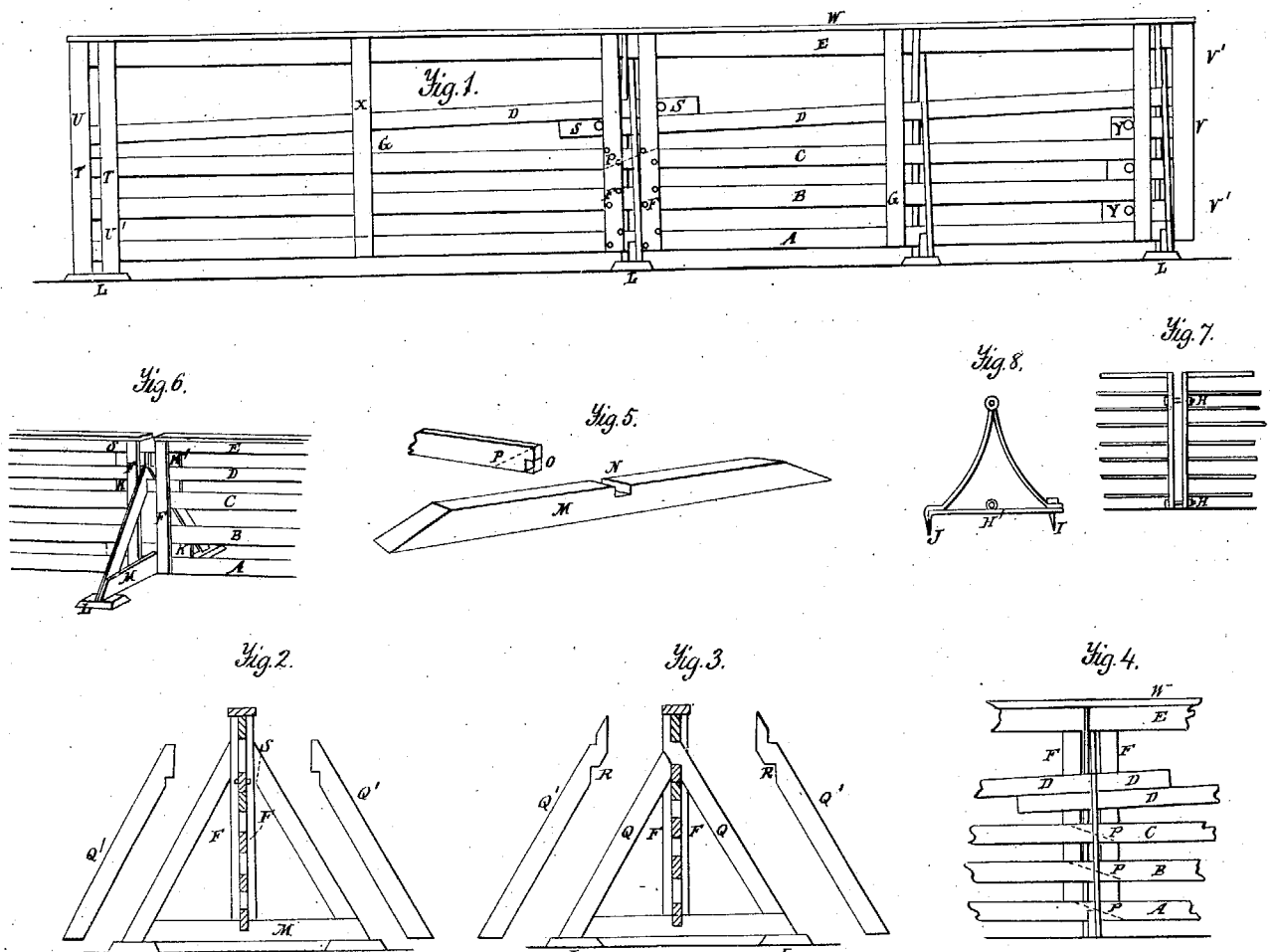
N. PETERS, PHOTO-LITHOGRAPHER, WASHINGTON, D. C.

UNITED STATES PATENT OFFICE.

JAMES G. HUNT, OF CINCINNATI, OHIO.

IMPROVED PORTABLE FIELD-FENCE.

Specification forming part of Letters Patent No. 16,236, dated December 16, 1856; Reissue No. 474, dated June 30, 1857.

*To all whom it may concern:*

Be it known that I, JAMES G. HUNT, of the city of Cincinnati, in the county of Hamilton and State of Ohio, have invented new and useful Improvements in the Construction of Portable Fences; and I do hereby declare that the following is a full and exact description of the construction and operation of the same, reference being had to the accompanying drawings, making part of this specification.

Figure 1 represents a longitudinal view of the fence, showing two panels, and the manner of joining them. Figs. 2 and 3 represent cross-sections showing the foot-pieces and the manner of bracing the fence, and Fig. 4 the longitudinal section of a joint. Fig. 5 represents a detached section of the sill and rail; Fig. 6, a sectional view of two panels connected by keys, and Fig. 7 a section showing the same principle of construction as adapted to a wire fence.

Like letters refer to like parts in the several views.

The nature of my invention consists in the construction of a fence composed of sections or panels that can be taken down and put up without great amount of labor or waste of material, and at the same time rendering the fence strong and durable by the peculiar mode of bracing and combining each panel, and then bracing and combining the several panels, so as to form an entire fence.

In constructing my fences I first take four boards or bars—say ten feet long, four or five inches wide, and one inch thick, as seen at A B C D E, Figs. 1, 4, and 6. These bars are placed at suitable distances from each other—the three lower ones, say four or five inches apart, and the top bar, E, a distance of four or five feet from the bottom of the bar A, or equal to the height of the fence. Near each end of these, and upon each side, are placed slats of upright pieces, in length equaling the height of the fence. These slats are seen at F F in Figs. 1, 2, 3, 6, and are nailed to the bars A B C E, as represented. Two slats are placed in the middle, as seen at G, and secured in a similar manner, there being one upon each side.

Between the bars C and E is placed the bar D, which extends some eight or fifteen inches beyond the slats F F as seen at F F Figs. 1 and 4. Where the bars D D pass between the slats F F they are secured by a nail or pin, or the panels have short boards or keys nailed or pinned between the battens alternately in the panels to connect them together, and also to lock the brace, as shown in Fig. 6. This constitutes a panel ready for setting up.

For a fence designed simply to turn cattle, (oxen, cows, &c.,) the bars A and B may be omitted, thus allowing smaller animals—as sheep and swine—to pass from one inclosure to another, while larger animals would be restrained.

The panels of my improved fence may be made in part of wire by leaving out one or more of the rails and supplying wire instead thereof. When it is desirable to make the panels entirely of iron, I make a frame-work and fill it in with wire in any form; or the panels may be cast in any ornamental patterns. Both holes should be left at the top and bottom of the end bars for the insertion of the bolts H in Fig. 7. Fig. 7, also represents the wire panel, and Fig. 8 the brace. These triangular braces may be made of cast or wrought iron, with bolt-holes I, through which the bolts H pass, thus securing the advantage of the locks. Spikes I, of any suitable form, may project downward from the base-piece; or the lapped end may turn down, as shown in Fig. 8, for the purpose of being driven into the ground to make the support more firm.

If it is desirable to make the wood panels of a more ornamental form, the bars B C E may be omitted and upright pickets nailed to the bars A and D. In this case the panels may be connected by the projecting in whole or in part of the bars A D; or they may be connected by the keys K, which are their equivalents, and seen in Fig. 6.

For the purpose of making a secure foundation for the fence, a stone or block of wood may be used, as seen at L L, Figs. 1, 2, and 3. If the ground is not exactly level, one block may be raised to suit the opposite one, or one side of the brace may be made proportionately longer. I next take a sill, M, which is formed of a piece of timber, say one or two inches thick, and from three to five feet long. This is notched in the middle, upon the upper side, as seen at N, Fig. 5, to receive the key K, or projecting part of the rail or bar O, which either rests in said notch N or is also notched, as seen at O, Fig. 5; or this point of connection may form a miter-joint, as seen at P, Figs. 1, 4, and 5.

The fence is supported in an upright position by means of braces Q Q, (seen in Figs. 2, 3, and 6,) and also in detached section at Q′ Q′ in Figs. 2 and 3. The upper ends of these are slightly notched, as seen at R in the detached sections, so as to form a lock both upon the upper and under sides or edges of the bars D and E, or of the keys, as seen at K′, Fig. 6; or the locks may be formed without notching. The lower ends of these braces are nailed or pinned to the sides of the sill M, and may also be nailed or pinned at the point of intersection at their upper ends, or connected in any other convenient manner. In putting the panels together after these several preparations the sills M are placed upon their supports L and adjusted to a horizontal position. The two ends of separate panels are then brought together and the brace slipped over on the projecting ends of the bars D D or keys K K′, which bars or keys are passed between the slats F F until the two ends of the panels meet against the brace. The braces are thus held between the ends of the panels and at right angles thereto, as represented in Figs. 2, 3, and 6. The panels are then secured by a pin or nail that passes through the bars or keys, as seen at S S, Figs. 1, 2, and 6, thus preventing their separation. In turning a corner or angle one or more of the bars D, &c, or keys K, pass between two slats, with which a panel is provided for that purpose, as seen at T T, Fig. 1, and immediately above or below the corresponding bar D or B (as the case may be) in the panel standing at right angles thereto, as seen at U U′, Fig. 1. The lower section of the panel is secured by means of a short bar or key, U′, introduced between the bars A and B, Fig. 1, the end of which is seen in the figure. An extra pair of slats can also be added, as seen at V, Fig. 1, to which hinges may be attached for hanging a gate. The hinges are shown at V′ V′, Fig. 1; or the arms extending from the gate-post may pass in between the battens and the rails of the fence Y, and being secured in place in the same manner as the panels are by the keys, and also supported by the brace in a similar manner.

If, for the purpose of strength and durability, or for the sake of appearance, it is desirable, a board may be nailed flatwise upon the top of the fence, as represented in the figures at W, so as to protect all the exposed ends of the timber.

In addition to the foregoing means of bracing and securing the fence from a lateral movement I also strengthen the middle of the panels by introducing an extra set of slats, H, Fig. 1, a slat being placed upon each side of the bars and secured by nails or pins.

The fence may be rendered still more secure by using braces like those seen in Figs. 2 and 3, but without a sill, the braces resting directly upon the ground or upon blocks, as do the other braces.

It will be observed that braces constructed in this manner are adjustable to any part of the fence and applicable to any height.

What I claim as my improvement in portable fence is—

Connecting the panels or sections of a fence by the projection of one or more rails in whole or in part from one section or panel beyond the slats or battens, between the slats and battens of the adjoining panel, and supporting and locking the fence by compound triangular braces, substantially as shown and described, and arranged with reference to the projection of the rails or their equivalent keys, for the purpose specified.

JAS. G HUNT.

Witnesses:
ALFRED T. GOSHORN,
GEO. HOADLEY.